FLOW I AND FLOW II HAVE SUBSONIC VELOCITY
RELATIVE TO THEIR CONTACT SURFACE

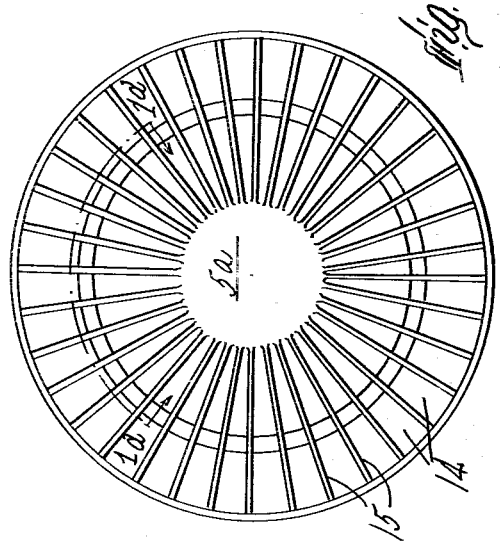
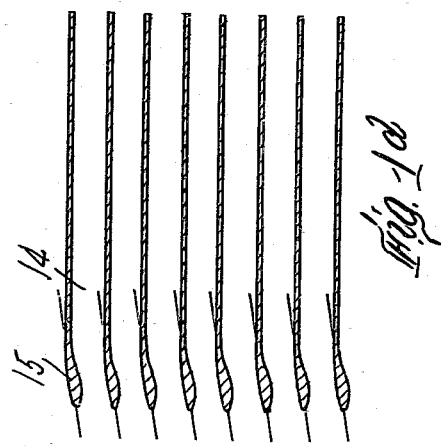
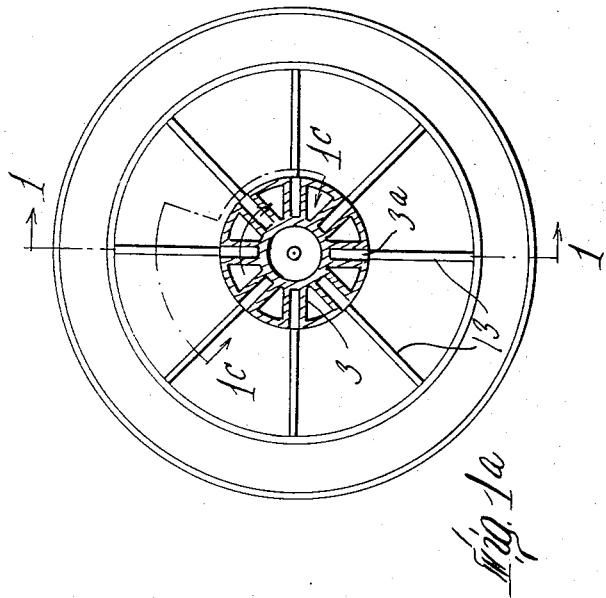
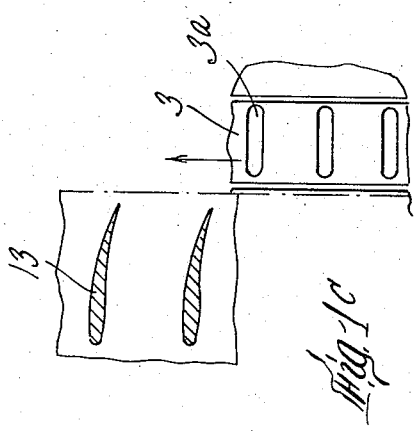

FLOW I AND FLOW II HAVE SUPERSONIC VELOCITY
RELATIVE TO THEIR CONTACT SURFACE

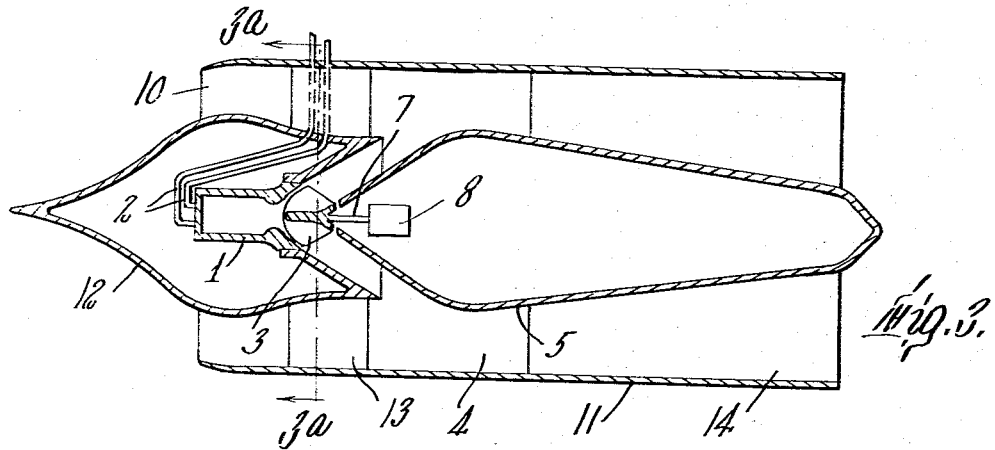
Fig. 3.
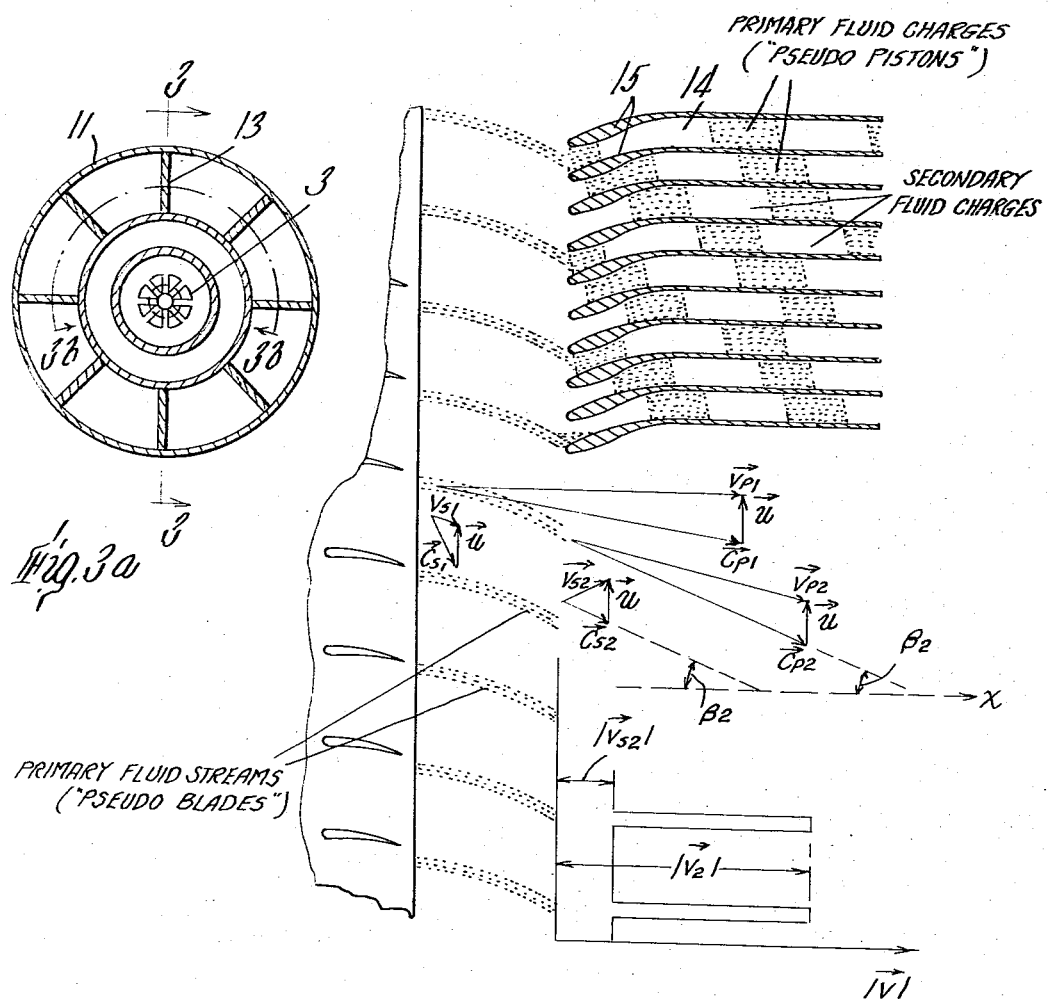
Fig. 3a
Fig. 3b

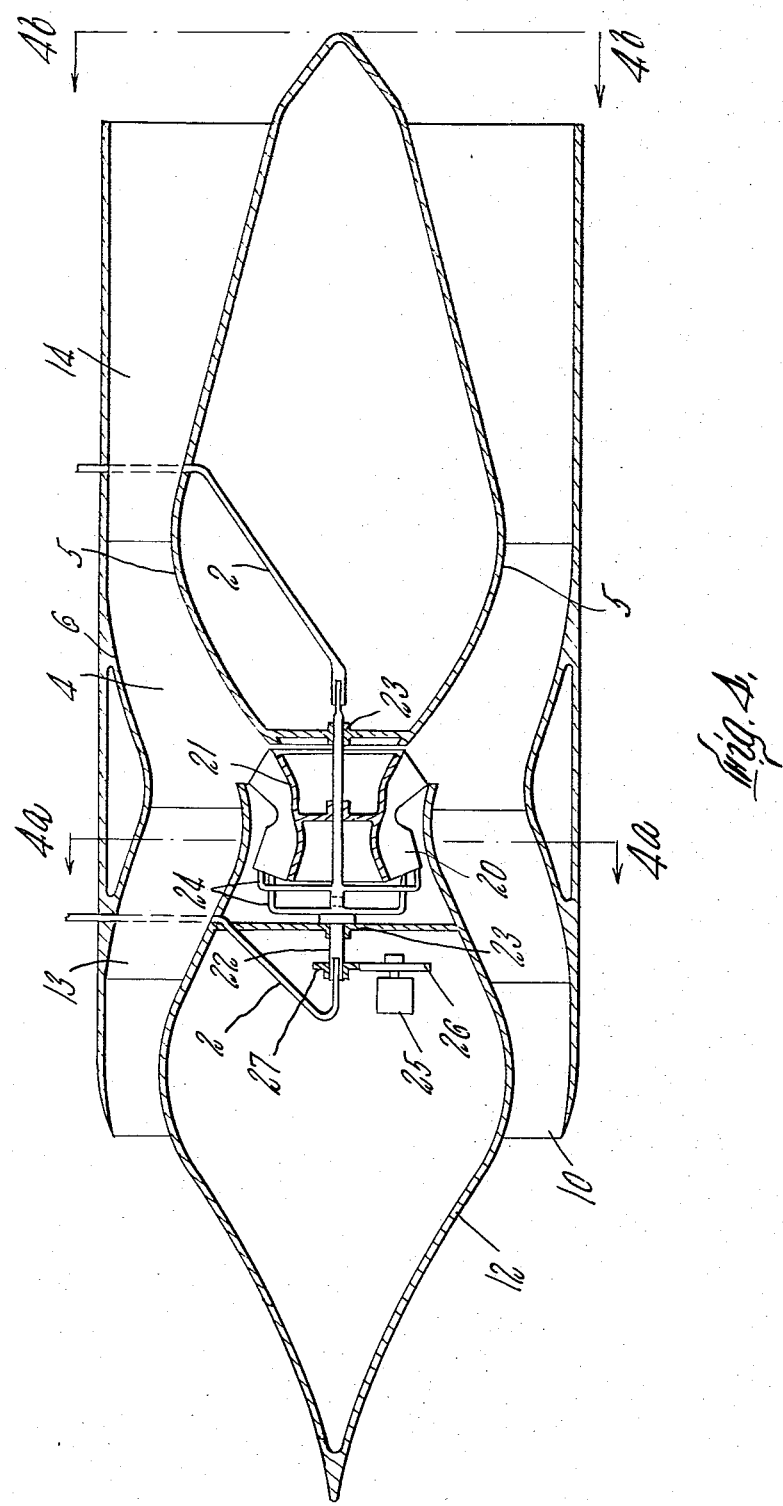

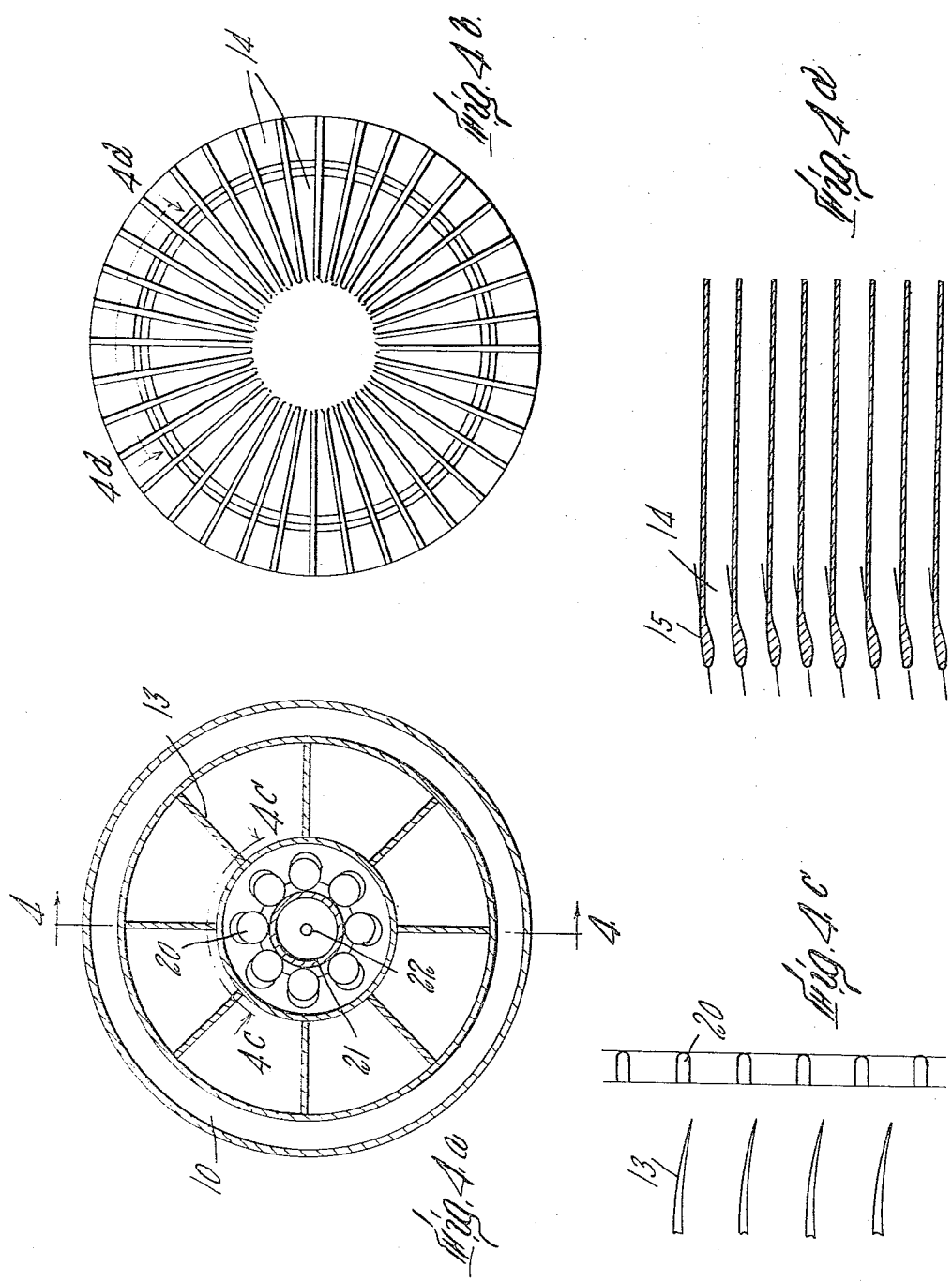

3,357,191
PROPULSION MEANS
Felix Berner, 70 Essex St., Lynnfield, Mass. 01940
Filed Oct. 20, 1964, Ser. No. 405,302
14 Claims. (Cl. 60—269)

1. INTRODUCTION

During the last few years considerable interest has developed for jet propulsion systems which have characteristics intermediate to those of pure chemical rockets on the one hand and aviation gas turbines on the other hand. The reasons for this interest are the very low specific impulse of chemical rockets which is inadequate for many missions, and the modest thrust-to-weight ratio of turbojet engines which makes these powerplants unattractive for many boost missions, especially at launch and at flight speeds where they can swallow only a fraction of the air which they intercept.

In principle it would be possible to close the gap in the propulsion spectrum between pure air-breathers and chemical rockets either by modifying aviation gas turbines with the aim of increasing their thrust-to-weight ratio and extending the speed range within which they can operate, or by adding to pure chemical rockets certain components which enable them to use some of the surrounding atmosphere as momentum medium and possibly as oxidizer. Because gas turbines are very complex machines while chemical rockets (particularly solid propellant rockets) are among the simplest propulsion devices known, interest has focused primarily on measures involving the addition of air-processing components to chemical rockets with the aim of increasing their specific impulse at the expense of their very high thrust-to-weight ratio. Depending on the degree to which chemical rocket propulsion systems are modified in this fashion, one may speak of simple air-augmentation systems or elaborate dilution cycles for chemical rockets. In general the former aim at increasing the thrust of the propulsion system without (secondary) combustion whereby the aspirated or scooped air is simply used as momemtum medium, or they do achieve secondary combustion involving all or a fraction of the excess fuel in the rocket gases but the mass flow rate of entrained air is so small as to cause only a minor change of the rocket's characteristics. The latter represent a larger departure from pure chemical rockets; a complete air-breathing engine, having distinctively different characteristics, is built around the rocket motors and the latter act merely as (primary) energy source of this hybrid propulsion system.

2. AIR-AUGMENTED ROCKETS AND HYBRID PROPULSION SYSTEMS

Under certain conditions one can increase the thrust of a jet propulsion system by increasing its propulsive efficiency. The propulsive efficiency reaches its maximum value of 100% when the jet velocity of the exhaust gas in the frame of reference of the propulsion system is equal to the flight speed. In the case of chemical rockets, the velocity of the exhaust gas at the exit of the nozzle is between about 2400 m./sec. and 4000 m./sec., depending on the propellant combination and expansion ratio. Thus, at all flight speeds smaller or larger than about 30% to 50% of orbital speed the propulsive efficiency of chemical rockets is less than 100% and, in particular, at launch (zero flight speed) the propulsive efficiency is zero. While there are no practical ways to improve the propulsive efficiency of chemical rockets above the optimum flight speed, it is possible to increase their propulsive efficiency at low flight speeds if some of the surrounding air is conducted through and suitably acted upon in the propulsion system, i.e., the propulsive efficiency can be increased if some of the energy of the rocket exhaust gas is transferred to the air which has been aspirated through or scooped by some appropriate intake. Specifically, since the propulsive power of the exhaust gas jet is proportional to the third power of the exhaust velocity while the gross thrust [1] is proportional to only the square of the exhaust velocity, the thrust reaches a maximum for a given ratio of air mass flow rate to rocket gas mass flow rate ("entrainment ratio") if rocket gas and air leave the propulsion system with the same velocity, i.e., if both media have the same kinetic energy at the exit.

In principle, then, one can augment the thrust of a jet propulsion system by merely improving its propulsive efficiency through the proper transfer of mechanical energy (kinetic or potential) from its exhaust gas jet to the aspirated or scooped air. In general it is possible to further increase the thrust by transferring heat energy from the hot exhaust gas of the primary engine to the inducted air (e.g., through mixing). It should be noted, however, that heat energy as such is useless for propulsion. It becomes useful only if it is converted into kinetic energy. Such an energy conversion is possible if the heat addition is followed by an expansion of the medium; the conversion efficiency increases if the expansion increases. This means that, in the absence of ram-compression (launch condition), the transfer of heat energy to the aspirated air becomes useful only if it is preceded by or if—in the limit—it takes place concurrently with the transfer of mechanical energy from primary gas to the air, whereby the latter's static pressure (or potential energy) is increased. At higher flight speeds where ram compression becomes important, there is no particular need for an efficient transfer of mechanical energy from primary fluid (rocket gas) to secondary fluid (air) because the large expansion across the exhaust nozzle automatically insures that a very large fraction of the heat energy (including dissipated mechanical energy) is converted into kinetic energy.

A still further thrust increase can be achieved if the heat addition to the air is increased by burning fuel in the air stream. Of course, the observation made in the preceding paragraph concerning the static pressure during heat addition also applies here. Usually the rocket exhaust gases contain a fair amount of unburned fuel which can be burned if it is mixed with the air (secondary combustion). If not all of the oxygen of the air is used in this process, it is advantageous to spray additional fuel into the air flow up to the stoichiometric amount.

It should be noted that the use of air as momentum medium alone results in a reasonable thrust augmentation only from launch up to low supersonic flight speeds. On the other hand, if means for secondary combustion are incorporated, the usefulness of the hybrid engine is extended to much higher flight speeds, and, in fact, the engine will perform more or less like a ramjet at higher supersonic speeds whereby the rocket(s) may play a secondary role if the air mass flow rate exceeds the rocket propellant mass flow rate. In certain situations it may then become advantageous to shut down the rockets and to operate the propulsion system as a pure ramjet engine with a high specific impulse.

It follows from the above discussion that, as far as the propulsion at intermediate and high supersonic flight speeds is concerned (Mach 3 and higher), there would be no need at all for a hybrid propulsion system in many situations; a pure ramjet engine could fully replace the chemical rockets. Thus, hybrid engines are primarily of interest from launch up to low or intermediate supersonic speeds. However, if the efficiency of the transfer of me- ---
[1] The gross thrust of an air-breathing propulsion system is defined as the sum of net thrust (or "actual thrust") and momentum flux of the swallowed air in front of the air intake.

chanical energy from the rocket gas to the air is low, then the thrust augmentation will generally be unsatisfactory, and, in fact, the air-augmentation system may lead to a thrust loss rather than a thrust augmentation at low flight speeds.

We reach the very important conclusion that hybrid engines should incorporate means for a reasonably efficient transfer of mechanical energy from the rocket gas to the air and means for mixing of these fluids and for secondary combustion. If the energy transfer cannot be made an efficient process, then it will be very difficult to justify a dilution cycle for the chemical rockets. Taking into account the cost of developing new types of propulsion systems, one may find that it is then more advantageous to use physically separated rockets and ramjets. These conclusions are worth stressing because they are largely ignored by the proponents of air-augmentation systems for rockets. They apply to systems with large as well as small entrainment ratios; hybrid engines with large entrainment ratios could be replaced by rockets and relatively large ramjets that operate in sequence as the BOMARC and TALOS interceptors, and air-augmentation systems with small entrainment ratios could be replaced by one or several small ramjet engines which would assist the unmodified rocket at supersonic speeds.

3. KNOWN METHODS OF EXCHANGING MECHANICAL ENERGY BETWEEN FLOWS

Since the efficiency of the transfer of mechanical energy from the rocket gas to the inducted air is of crucial importance for air-augmentation systems for rockets and for hybrid engines, it is interesting to review known energy or momentum transfer methods from the point of view of the efficiency. Of course, other factors may affect the suitability of a given method also, and they will be mentioned as well.

One method for the indirect energy transfer is employed in turbo-fan versions of aviation gas turbines. Energy is extracted from the exhaust gas in a turbine which drives an air compressor or fan. This energy transfer scheme is relatively efficient—the energy transfer efficiency is essentially equal to the product of turbine and turbofan efficiency— but it cannot be employed in the case of ordinary chemical rockets because the temperature of the rocket gas is too high for turbines.

An indirect and similarly efficient energy transfer method, which is compatible with and actually demands a rocket gas flow of high temperature, employs a magnetohydrodynamic (MHD) generator instead of a turbine. However, this scheme imposes a restriction on the rocket gases as well: Practical MHD generator designs call for a stagnation pressure ratio across the generator of not more than about 20, and the static pressure and flow Mach number at the generator exit should be not more than about ½ atmosphere and not less than about one, respectively. Thus, it will not be possible to mix the compressed air with the rocket gas downstream of the generator. A possibly more serious drawback of this scheme is its re-requirement for an electric motor in addition to a turbo-compressor. Even if cryogenic or superconducting magnets were employed, this system would probably be too heavy for rocket applications, unless the absolute size is of a magnitude where the rate of energy transfer is in the range of thousands of megawatts (in which case the homopolar electric motor becomes a major development problem).

A direct and inexpensive energy transfer method uses the ejector or jet compressor principle: The rocket gas flow (primary or driving flow) entrains an air flow (secondary or driven flow) in a suitable duct which is connected with the air inlet. This scheme is compatible with primary fluids of any stagnation temperature and stagnation pressure. On the other hand, since the energy transfer in the ejector is solely due to viscous stresses, it is a highly dissipative process and it is particularly inefficient if the density of the primary fluid is significantly lower than the secondary fluid density.

The remark concerning the very low efficiency of jet compressors applies primarily to designs in which the driven fluid has a subsonic speed (subsonic ejector). If both driving and driven fluid are supersonic throughout the ejector and if the initial temperatures of the two fluids are sufficiently different, then there exist thermodynamically possible solutions with a stagnation pressure of the mixed stream higher than the stagnation pressure of the two initial streams.[2] However, if both initial flows as well as the mixed stream are supersonic, then the static pressure of the flows are generally below or at best equal to the free stream static pressure under all flight conditions for which a high energy transfer efficiency is important. One expects, therefore, that the heat added to the air in a supersonic ejector at lower flight speeds cannot be converted into a form useful for propulsion; a conversion into kinetic energy is possible, of course, but the flow will be strongly overexpanded. Consequently it is most unlikely that the supersonic ejector offers significant advantages over the subsonic ejector; both devices are expected to lead to a thrust loss rather than a thrust increase at subsonic and transonic flight speeds.

4. NEW METHODS OF EXCHANGING MECHANICAL ENERGY BETWEEN FLOWS

In view of the serious disadvantages of the energy transfer schemes discussed above, it is of interest to investigate what possibilities exist for a direct but efficient energy exchange between flows.

Since the energy transfer from the blades of a turbocompressor or from the piston of a piston compressor to a fluid is substantially non-dissipative (i.e., the presence of viscous stresses is not required), this type of process should be retained in any new energy transfer scheme. However, the energy or momentum transfer process will then be direct only if the fluid of initially higher momentum takes the place of blades or pistons in conventional compressors.

Devices in which the primary fluid takes on the duty and—to some extent—the shapes of blades and pistons of ordinary compressors are the so-called crypto-steady energy exchanger and wave energy exchanger, respectively. (In what follows we shall call these devices simply crypto-steady exchanger and wave exchanger.) So far only preliminary investigations have been made of these devices[3], and they have not yet been used in potential applications.

Common to both types of energy exchange is the non-steady nature of the flows. Indeed, one can show that, in the absence of body forces, the energy level of a fluid element in an adiabatic flow can be changed without the need for viscous forces only if the flow is nonsteady.

*(a) The crypto-steady energy exchange*

Suppose that a (secondary) fluid, which is to receive momentum or mechanical energy from another fluid, flows steadily through an annular channel whereby the velocity vectors are parallel to the axis of the annulus. Suppose also that at some station a series of substantially axially oriented jets of another fluid (primary fluid) emerges with a steady velocity from nozzles which are evenly spaced circumferentially within the annular flow passage. Consider now the interaction between primary and secondary flows at the merger station and downstream of it, assum- ---
[2] E. D. Kennedy: "Mixing of Compressible Fluids," Journ. Applied Mechanics, September 1961.
[3] J. V. Foa: "A New Method of Energy Exchange Between Flows and Some of Its Applications," Rensselear Polytechnic Institute, Dept. Aeron. Eng., Tech. Rept. AE5509, December 1955.

ing that the primary flows have a substantially larger velocity than the secondary flow.

If the nozzles are stationary, then one has apparently the situation of a steady-flow ejector system with multiple driving jets which is currently under investigation at the Martin-Marietta Corp.[4] The primary fluid forms straight jets with a steady velocity and the only transfer of mechanical energy from primary to secondary fluid is due to viscous stresses and occurs in mixing zones which grow slowly in downstream direction between the flows and eventually engulf them if the annular channel is long enough. Here we are interested only in the interaction over a very short distance from the merger station. Consequently we can assume that practically no mixing will occur and hence no energy is transferred from the primary fluid to the secondary fluid over the channel length of interest.

The situation changes drastically if the nozzles rotate about the chanel axis. Neglecting, for the time being, the effect of the nozzles upon the flows (as far as the angular momentum is concerned), we can easily visualize how the primary fluid jets must now form helical patterns which rotate about the axis of the annulus with the same angular velocity as the nozzles. The change from straight to spiral or helical patterns is brought about by a glancing collision between primary and secondary flows near the merger station whereby the two flows deflect each other to a common orientation. Restricting the considerations again to a short length from the merger station, we recognize immediately that the deflected primary fluid jets look like blades of a rotor of a turbo-machine and that the secondary flow between these deflected jets ("pseudo blades") is similar to the flow between the rotor blades in a turbo-machine. Consequently, we expect that there will be an exchange of mechanical energy between the pseudo blades and the secondary flow quite similar to the energy exchange between blades and fluid in the rotor of a turbo-machine. Like in the latter device, this exchange is not due to viscous stresses and it can take place over a very short distance.

It is shown in Appendix A of this report that such a substantially nondissipative energy exchange can occur only if the flows are nonsteady. Actually, one can reverse this statement and say that, at least partially, mechanical energy will be exchanged in a nondissipative fashion if the interacting flows are nonsteady. That the requirement of nonsteady flows is satisfied in our situation is immediately apparent if one observes the changes of the flow patterns from a fixed position on the machine. However, there is one frame of reference in which the flow patterns do not move or change (this frame is attached to the moving nozzles) and it is for this reason that the process under discussion has been called "crypto-steady energy exchange" by Foa.

It is obvious that the flow channel need not be formed by two co-axial cylinders. It could, in principle, be formed by various co-axial, axis-symmetric surfaces. Depending on the geometry of the channel, one has situations analogous to axial, mixed-flow or radial (centrifugal or centripetal) turbo-machines. FIG. 1 shows a thrust agumenter with a crypto-steady exchanger corresponding to a mixed-flow compressor. Such a design is believed to represent a good compromise between the requirements for a relatively high momentum transfer from the rocket gas to the air and a realtively low frontal area of the engine (per unit mass of air flowing through it per unit time). However, we will first discuss and later evaluate an axial-flow crypto-steady exchanger simply because it is somewhat easier to describe and analyze. It is shown schematically in FIG. 3. It will become evident that, with the assumptions made[5], the results will be very nearly the same as the ones which one would obtain for a mixed-flow exchanger which has the same gas generators and in which the angular velocity and the peripheral velocity of the flow patterns at the exit is the same.

Before discussing the crypto-steady exchanger in some detail, a few remarks shall be made concerning the stability of the flows in this device. One must expect that the concept of well-defined helical blades may be quite unrealistic in many situations. Indeed, it is well known that instalibities can exist at the contact surface of two fluids of dissimilar velocity. Suppose that some disturbance causes the contact surface to take on a shape as shown in FIG. 2a. If the relative velocity between the two flows is subsonic, then the initial deformation of the contact surface gives rise to over-pressures, equal pressures, and under-pressures as indicated by the $+$, $=$, and $-$ signs, respectively. It is obvious that this situation is highly unstable, i.e., it will result in an amplification of the wave form, followed by a distintegration of the contact surface. On the other hand, if the relative velocity between the two flows is so large that both fluids have a supersonic velocity relative to a deformation of the contact surface, then pressure variations are generated as shown in FIG. 2b. It is evident that this situation is stable, i.e., the generated pressure distribution tends to counteract the disturbance and it will restore the initial shape of the contact surface.

The above discussion of the stability of jet boundaries was based on the assumption of inviscid flows. In reality, there will be viscous stresses at and near the contact surface of the fluids and consequently a boundary layer-type flow will be generated in both fluids. These boundary layers have a destabilizing effect; they are of no particular interests in the first situation which is unstable anyway, but they are important in the second situation because they will modify the picture shown in FIG. 2b due to the fact that the flow velocity relative to the boundary will be subsonic in its immediate vicinity. While gross deformations of the contact surface are expected to be smoothed out by the induced pressures in the outer portions of the boundary layer and in the inviscid flow region, smaller disturbances will lead to a break-up of the contact surface due to the subsonic flow regions within the boundary layers [6]. We conclude, therefore, that in a situation as shown in FIG. 2a, the contact surface will very quickly be replaced by a turbulent mixing zone of considerable thickness and that in a situation as shown in FIG. 2b, the mixing zone is also present but that it grows slower than in the first situation. This conclusion is well supported by the results of investigations by Bershader and Pai [7] and others.

The question arises what the relative flow velocities between the two fluids must be if the second situation shall occur. If both fluids have the same density, then the disturbance in the contact surface will move with about the average velocity of the two flows. It follows that the two flows should have a relative velocity larger or about equal to twice the sonic speed in the fluid. If the two fluids do not have the same density, then the contact surface and its deformations are likely to move with a speed that is somewhat closer to the velocity of the denser fluid than to the velocity of the fluid with the lower density. Nevertheless, one expects that the difference in flow Mach number of the two fluids must still be not much larger than two. Because

---

[4] "NASA-USAF test thrust augmentation offered by airscoop shroud," Aviation Week, vol. 79, No. 17, Oct. 21, 1963.

[5] A small difference is due to the fact that the energy dissipation in the two designs is not identical. E.g., in the mixed-flow design the primary fluid merges with the secondary fluid immediately upon leaving the rocket nozzles while in the axial flow design it experiences some losses in the flow passage between the rocket nozzles and the merger station.

[6] The usual assumption of a constant static pressure across the boundary layer is obviously not satisfied if irregularities exist in the boundary which are smaller than the boundary layer thickness.

[7] D. Bershader and S. J. Pai: "On the Turbulent Jet Mixing in Two-Dimensional Supersonic Flow," Journ. Appl. Physics, vol. XXX, 1950, p. 616.

the speed of sound is related to the density of the fluids, one has then still about sonic or supersonic flows relative to the boundary on both sides of the contact zone. Szablewski [8] has found that the change of the mixing zone width due to a change of the relative densities of the fluids is relatively small over a wide density range.

The implications of the above discussion are clear. The crypto-steady energy exchange between incompressible or subsonic flows as proposed by Foa will be most difficult to achieve because of the rapid disintegration of the pseudo blades, particularly if the flow paths are bent substantially, i.e., if the "loading" of the pseudo blades is large. From the point of view of stability considerations it is especially unfortunate that an effective crypto-steady energy exchange, if not assisted by another type of energy exchange, really is of interest only if it leads to a substantial equalization of the kinetic energies and hence velocities of the two fluids.

My situation, which is discussed below, differs from the situation to which Foa has applied this mode of momentum transfer. In our application the pseudo blades are expected to be relatively stable because the difference in flow Mach number of the two fluids is close to two at the beginning of the interaction [9] and because the exchange of mechanical energy is quite small when compared with the initial difference in kinetic energy of the two fluids. Moreover, any deformation of the contact zone caused by some disturbance other than the actual crypto-steady momentum exchange is swept downstream with a speed equal to about twice the sonic speed in the air and consequently has little or no chance to cause a disintegration of the helical streams of rocket gas and air. Nevertheless, even in our situation, the assumption of more or less well-defined pseudo blades will be realistic only if, for a given length of the flow paths in the crypto-steady exchanger, the width of individual fluid streams is equal to or larger than a certain value. To fix this value, a criterion must be established for the percentage of total fluid that can be subjected to turbulent mixing without significantly affecting the results of the analysis. The width-to-length ratio of the mixing zone can be estimated with the aid of a semi-empirical analysis due to Pai [10].

Returning to the description of the crypto-steady exchanger, we assume that it is permissible to proceed with a preliminary analysis on the basis of totally unmixed flows. I.e., we assume that the interaction between primary and secondary flows will indeed take place over a short enough distance to make it permissible to neglect the effect of transport processes that take place between the two flows. Therefore we will deal with well-defined pseudo blades that can be compared with the blades of turbo-machines. Because of the similarity between ordinary turbo-machines and crypto-steady exchangers, we will conduct the latters' analysis in a way that was proven useful for the formers' analysis. Specifically, we will discuss the flow processes in a cascade of pseudo blades (two-dimensional flow) rather than in an annulus; i.e., we assume, for the purpose of describing the flow processes, that the annulus is developed in a plane and that centrifugal forces and other secondary effects can be neglected. As is customary in the analysis of turbo-machines, we will introduce velocity triangles.

To describe the flow, it is necessary to define two frames of reference: (1) a stationary or "absolute" frame of reference, (2) a "relative" frame of reference which is attached to the pseudo blades and consequently moves relative to the absolute frame with the peripheral velocity $u$. The flow velocities in the two frames of reference will be called the absolute velocity $\vec{v}$ and the relative velocity $\vec{c}$, respectively. The relative velocity is obtained from a simple (vector) addition of absolute and peripheral velocities, i.e., $\vec{c}$, $\vec{v}$ and $\vec{u}$ form the velocity triangles (see FIG. 3).

At the exit of a rotor of a turbo-compressor or turbine, the vector of the relative velocity is very nearly parallel to the blades at their trailing edges. Because in a crypto-steady exchanger the "blades" are formed by the primary fluid, we expect that at the exit of this device (subscript 2) the vectors $\vec{c}_{p2}$ and $\vec{c}_{s2}$ of the relative velocities of primary and secondary fluid will be parallel to each other.

On the other hand, the vectors $\vec{c}_{p1}$ and $\vec{c}_{s1}$ of the relative velocities of primary and secondary fluid at the entrance of the crypto-steady exchanger will, in general, not be parallel to each other because the vectors $\vec{v}_{p1}$ and $\vec{v}_{s1}$ of the absolute velocities of the flows will have arbitrary directions and magnitudes. We conclude, therefore, that the crypto-steady energy exchange is characterized by a change of direction of the vectors of the relative flow velocities, i.e., by a deflection of the particle paths in the relative frame of reference. Since the peripheral speed $u$ is the same at positions 1 and 2—as mentioned earlier we will discuss an axial-flow crypto-steady exchanger—it follows that the vectors of the absolute velocities $\vec{v}_p$ and $\vec{v}_s$ must change direction along with the vectors of the relative velocities. Coupled with this change of direction of the velocity vectors is a change of the magnitudes of the vectors and hence a change of the respective levels of kinetic energy.

If we assume first that the cross section of the annular channel is varied in axial direction so that the static pressures at the beginning and end of the crypto-steady energy exchange are the same, then the energy transfer from primary to secondary fluid is apparently connected with the alignment of the vectors of their relative velocities. This phase of the crypto-steady energy exchange, which we shall call the "alignment phase," [11] is the analogue to the processes in turbocompressors and turbines.

If the cross section of the annular channel is varied so that the static pressure of the fluids changes, then there is still another phase of crypto-steady energy exchange even after the vectors of the relative velocities have become substantially parallel to each other. It is due to the fact that the pressure and velocity changes of primary and secondary fluid due to a given area change are not identical because of differences in the flow properties (Mach number, specific heat ratios, etc.). However, the static pressure cannot change abruptly at the contact surfaces of the fluids and consequently the deflection of the flow paths will continue and a further energy exchange will take place in a way such that the condition of a continuous pressure change in the vicinity of the interfaces will occur. This second phase of crypto-steady energy exchange has no counterpart in ordinary turbo-machines, and it differs also from the first phase in that the energy transfer can proceed either from primary to secondary fluid or vice versa, depending on whether the static pressure decreases or increases in flow direction. In our situation, where primary and secondary fluid are rocket gas and air, respectively, whereby the former has a lower density and higher Mach number than the latter, the energy transfer will proceed from primary to secondary fluid if the static pressure decreases and it will proceed in

---

[8] W. Szablewski: "Die Ausbreitung eines Heissluftstrahles in bewegter Luft." Thesis Gottingen, Germany, 1942.
[9] The initial primary flow Mach number is close to three and the secondary flow has an initial Mach number equal to or somewhat smaller than one.
[10] S. J. Pai: "Two-Dimensional Jet Mixing of a Compressible Fluid," Journ. Aeron. Sciences, August 1949.
[11] Foa calls this phase the "deflection phase." This name is unfortunate because, as we will see, any phase of crypto-steady energy exchange involves a deflection of the flow paths.

the opposite direction if the static pressure increases in flow direction.

It is obvious that a strict separation of the two phases of crypto-steady energy exchange discussed above is neither practical nor desirable. Initially one will have a combination of both phases, but further downstream one might have only the second phase because the alignment phase will extend only over a rather short distance.

As far as the selection of channel cross section in flow direction is concerned, the following general observation can be made. Depending on the initial conditions, the secondary fluid can have either a subsonic or supersonic flow velocity immediately after the first interaction with the primary fluid. Assuming that the channel cross section is first reduced in flow direction, the secondary fluid can then be made to reach sonic speed. If the area available for the secondary fluid increases from this point on, the calculation of the flow in the crypto-steady exchange has two solutions, namely solutions corresponding to subsonic and supersonic air flow at the exit.[12] If the "supersonic solution" is achieved, then the energy transfer from primary to secondary fluid will continue during the second phase of energy exchange, and if the "subsonic solution" is obtained, then the energy transfer will occur in opposite direction during the second phase.

Returning to the first phase of crypto-steady energy transfer and its similarity with the flow processes in turbomachines, we note that one of the more important parameters in axial-flow compressors and turbines is the blade camber. Since the "loading" of their blades and consequently the degree of energy transfer to or energy extraction from the fluids in compressors and turbines depends strongly on this paramater, we expect that it will play an important role also in the crypto-steady exchanger. In the latter the camber of the pseudo blades depends substantially on the difference of the tangential components of the velocity vectors $\vec{c}_{p1}$ and $\vec{c}_{s1}$ of the fluids at the beginning of the interaction. The degree of energy transfer is increased during the alignment phase if the primary fluid jets and the secondary flow are introduced with a positive and negative angular momentum, respectively. The initial negative angular momentum of the secondary flow can be obtained by placing appropriately shaped guide vanes in the secondary flow passage upstream of the interaction region. An initial positive angular momentum of the primary fluid jets could be obtained by applying an (external) torque to the rotor to which the primary flow nozzles are attached.

One fundamental difference between a crypto-steady exchanger (operating in the alignment phase) and a standard turbo-compressor is worth mentioning at this point. In the latter no energy can be extracted from the blades themselves. Thus, in order to impart energy to the fluid in a turbo-compressor, one must apply a torque to the rotor to which the blades are attached. In the case of a crypto-steady exchanger the energy for compression and/or acceleration of the secondary fluid can be provided by the pseudo blades themselves. In other words, not only does the primary fluid form pseudo blades, the action of which on the secondary flow is similar to the flow induction process of solid blades in a turbo-compressor, but the action of the secondary on the primary flow is similar to the energy-extracting action of a turbine. Thus, the energy-extracting action of a turbine and the energy-adding action of a compressor are compounded in a single step, whereby energy is transferred from one fluid to the other directly, without the intermediary conversion to shaft work. We conclude that, while the rotation of the primary fluid jets about the engine axis is essential—only then will the flow change with time at a fixed position in the interaction space—it is not necessary to apply a torque to the rotor to which the primary flow nozzles are attached. In fact, it is possible to extract some shaft power from the rotor, e.g., in order to avoid the requirement for an auxiliary power unit for the propulsion system.

Even if the angular momentum of the primary flow were not reduced prior to its interaction with the secondary flow, the energy transfer to the secondary flow would still be unsatisfactorily low in the present application. Indeed, one can show that the degree of energy transfer depends strongly on the ratio of peripheral speed $u$ to the absolute velocity $v_{p1}$ of the primary flow before interaction, an increase of the energy transfer being achieved if this ratio is increased. A nearly complete equalization of the kinetic energies of primary and secondary flows is possible only if this ratio is considerably larger than one [13].

As noted previously, chemical rockets have exhaust velocities $v \approx v_{p1}$ between about 2500 m./sec. and 4000 m./sec. On the other hand, the high heat transfer rates to the rocket nozzles lead to nozzle temperatures that rule out circumferential speeds of the latter in excess of about 100 m./sec. If primary and secondary fluid would interact exclusively at the radial distance (from the axis of rotation) of the nozzle exit sections, one would thus have a $u/v_{p1}$ between about 0.025 and 0.04. Calculations show that the crypto-steady energy exchange is insignificant under these conditions. To increase the energy transfer, one has to increase the distance between the center axis and the zone of final interaction, either by replacing the axial-flow design by a mixed-flow or radial-flow design or by letting the primary gas jets traverse a space bounded by two (stationary) co-axial cones before they merge with the secondary flow. As mentioned previously, we do favor a mixed-flow design for the application under discussion, but we will perform the analysis for the last-mentioned design.

The above measure, together with an expansion of the flows in a second phase crypto-steady energy exchange is not sufficient, however, to permit a reasonably large degree of energy or momentum transfer from primary to secondary flow. Because the static pressure of primary and secondary flow is the same at the end of the cypto-steady energy exchange [14], a measure of the degree to which this exchange has equalized the mechanical energy of the fluids is given by the ratio of kinetic energies of primary and secondary flows at the exit of the crypto-steady exchanger. FIG. 3 shows schematically the distribution of the kinetic energy in the absolute frame of reference at the exit of the crypto-steady exchanger. While the difference between the kinetic energies of primary and secondary fluid has been reduced across the crypto-steady interaction region, it is still too large for a satisfactory thrust augmentation.

*(b) The wave energy exchange*

The fact that the energy transfer from primary fluid to secondary fluid is quite low in the crypto-steady exchanger is not surprising if one bears in mind the similarity between the energy transfer to the secondary fluid in this device and the energy transfer to the fluid in a turbo-compressor. Indeed, a one-stage turbo-compressor also has a very limited capability to transfer energy to a fluid. A piston compressor, on the other hand, does not have this limitation. It is of interest, therefore, to investigate the potential of a direct energy exchange device in which the secondary fluid is acted upon in a fashion similar to that in a piston compressor.

---

[12] The mentioning of the "area available for the secondary fluid" rather than the channel area is intentional. In the application which interests here, the primary flow will be supersonic throughout the cryto-steady interaction region. Thus, the situation differs from that in an ordinary deLaval nozzle in that the secondary fluid will reach sonic speed slightly upstream of the smallest channel cross section ("throat").

[13] J. V. Foa: "Crypto-Steady Pressure Exchange," Rensselear Polytechnic Inst., Dept. Aeron. Eng. & Astron., Tech. Rept. AE 6202, March 1962.

[14] The conditions for this statement to be correct are given in a subsequent section.

The implementation of an energy exchange scheme, in which the primary fluid acts as pistons which compress and accelerate the secondary fluid, is conceptually quite simple: One merely has to place stationary walls into the annular flow passage of the crypto-steady exchanger in such a way that the annulus is divided into a circumferential series of ducts (FIGS. 1 and 3). As they sweep across the leading edges of these walls (with the peripheral velocity $u$), the fluid streams are broken up into individual packages ("charges"). In this situation, charges of primary fluid and secondary fluid enter individual ducts in sequence rather than simultaneously, provided that the width of the ducts (in circumferential direction) is of the same order or smaller than the widths of individual primary and secondary fluid streams upstream of the duct entrance. It is obvious that this scheme assures that both fluids have the same velocity and static pressure at their contact surfaces. Moreover, even though the flow is substantially nonsteady in the ducts, one may insure, through proper designing of the ducts, that the kinetic energies and static pressures of primary and secondary fluid, (mass) averaged over individual charges, are very nearly the same at the exit sections of the ducts.

Because the energy exchange in the ducts is, to a very large extent, the result of compression and rarefaction waves, the ducts will be called "wave tubes" and the series of ducts will be called "wave exchangers." This exchanger is similar in appearance to the stator of a turbocompressor, with one major exception: In general, the ratio of its length (in flow direction) to another characteristic dimension (e.g., the tube width or blade spacing) is considerably larger.

The efficiency of the transfer of mechanical energy in the wave exchanger is relatively high. Because the propagation speed of the energy-carrying compression waves and rarefaction waves and shocks is considerably larger than the transport speed of the mixing process, the substantially isentropic transfer of mechanical energy by these waves takes place before any appreciable mixing occurs.[15] Thus, the media have relatively low velocities and still smaller differences in velocity when mixing takes place and consequently very little kinetic energy is dissipated during the mixing process. It should be mentioned, nevertheless, that some instantaneous mixing will always occur at the position where the two fluids interact. Thus a more or less narrow zone of gas and air mixture will be sandwiched between the two columns of the interacting media.[16] It follows then that the benefits of the nonsteady energy exchange would be substantially lost if the individual charges of primary and secondary fluid would form very short columns (i.e., thin "slices").

Of course, mixing of the fluids accounts for only a fraction of the energy dissipation in the wave tubes. Additional dissipation occurs in shocks (in both fluids) and in the boundary layers. Particularly the boundary layer losses may be substantial if the flow is highly nonsteady. Moreover, if no other component follows the wave exchanger, then the extra kinetic energy invested in the pulsations at the tube exit (as compared with the kinetic energy of a steady flow which produces the same thrust with an equal mass flow rate) is lost even though it is not dissipated internally. We conclude that the nonsteadyness of the flow does help to reduce the mixing losses during the initial interaction of the fluids but that it is detrimental to the performance of the wave exchanger from all other points of view. It is obvious then, that in an ideal situation the flow would be steady everywhere in the wave tubes except near their entrance sections. Further below we will briefly discuss a tube geometry that may enable us to approach this situation. A proper design of the geometry alone will not be sufficient, however, to minimize the losses. This is particularly true if a plenum chamber is arranged in series with the wave exchanger whereby the stagnation pressure in this plenum chamber is larger than the stagnation pressure of the air in front of the wave exchanger.[17] Indeed, one must expect a temporary reverse flow from the plenum chamber during each cycle if the frequency of the energy exchange cycle is not properly selected. Such reverse flow is a well known phenomenon in partial admission turbines where it is responsible for this device's low efficiency.[18]

At this point it is instructive to point our certain differences between a wave tube and devices incorporating solid pistons. The latter are known to have very low flow capacities because the inflow and outflow of the medium is stopped by valves during a large fraction of an operating cycle. The incorporation of flow-controlling valves in a piston compressor is essential because, in order to aspirate a fluid charge, the piston must return to its original position after compression and expulsion of the preceding charge. The wave tube, on the other hand, does not require any flow controlling valves because (1) a (gaseous) pseudo piston must not return to the tube entrance after it has compressed and accelerated a secondary fluid charge,[19] and (2) the arrival of new pseudo pistons at the tube entrance can be timed so that reverse flow through the exit section of the tube can be prevented even if the pressure downstream of the wave tube is substantially higher than the pressure upstream of the tube. For this reason and also because there is an uninterrupted discharge of fluid from the crypto-steady exchanger to a wave tube, the wave exchanger is expected to have a much larger flow capacity than other nonsteady-flow devices in general and piston compressors in particular.

An estimate of the wave exchanger's flow capacity is made in a subsequent section. It is found that it depends on the energy dissipation, on the extra kinetic energy invested in the flow pulstations (or Busemann's "efficiency of nonuniformity") and on certain other parameters related to the flow oscillations. It was mentioned above that mixing of the fluids during the initial interaction of the flows is the most important dissipation process, and that it can be reduced only if the flows are substantially nonsteady. However, it was noted too that all other dissipation processes are larger in a pulsating flow than in an equivalent steady flow. It is clear, therefore, that a compromise must be found from the point of view of both, the energy transfer efficiency and the flow capacity: Flow fluctuations must be accepted in order to keep the mixing losses at a reasonably low level, but they should not be so large as to cause other forms of energy dissipation to become excessive or so as to result in an unacceptably large amount of excess kinetic energy.

The most important parameter in the search for an optimal compromise is the ratio of the frequency $f$ with which individual primary fluid streams arrive at the entrance section of a wave tube (energy exchange cycle frequency) to the natural frequency $f_n$ of the flow media in the tube, the latter being assumed to oscillate like a gas column in an organ pipe.[20] To obtain a feeling for

---

[15] Compression and rarefaction waves are isentropic and they travel with sonic speed relative to the (moving) fluid particles; shocks cause some dissipation and they propogate with supersonic speed.
[16] The thickness of the mixing zone depends essentially on the same factors that influence the efficiency of steady flow ejectors. It increases if the flow parameters are changed in directions that would cause a decrease of the ejector efficiency. E.g., the zone widens if the primary flow velocity is increased relative to the secondary flow velocity or if the ratio of primary fluid density to secondary fluid density is decreased.
[17] It will be shown later that a plenum chamber, acting also as mixing chamber and afterburner, is of great interest for thrust augmentation of chemical rockets.
[18] H. K. Heen and R. W. Mann: "The Hydraulic Analogy Applied to Nonsteady, Two-Dimensional Flow in the Partial-Admission Turbine," Trans. ASME, Journ. Basic Eng., September 1961.
[19] This fact suggests that, as far as the motion of the pseudo pistons is concerned, a wave tube is closer related to a rotary pump of the positive displacement type than to a piston compressor or free piston engine.
[20] Note, however, that the oscillations in a wave tube would differ from those in an organ pipe in that they are superimposed on a steady flow.

the magnitude of this ratio we shall briefly consider what happens if it is varied in a large range by varying the r.p.m. of the rocket motor. If it is chosen extremely large ($f/f_n \to \infty$),[21] then the flow in the compression tube becomes steady for all practical purposes [22] and the wave exchanger ("pulse ejector") becomes a "steady-flow ejector." The mass of an individual primary fluid charge approaches zero but the number of individual charges entering a wave tube in a (finite) unit of time approaches infinite, leaving unchanged the product of mass of a charge and number of charges per unit time (time-averaged primary fluid mass flow rate). The entrainment ratio (ratio of time-averaged secondary fluid mass flow rate to time-averaged primary fluid mass flow rate) and the energy transfer efficiency become then approximately equal to the entrainment ratio and efficiency of an ordinary steady-flow ejector with a primary flow of equal initial kinetic energy.[23] If now we decrease gradually the frequency ratio $f/f_n$, then the flow becomes nonsteady. At first, the slices of primary fluid and secondary fluid before interaction are still of a thickness comparable with the thickness of the mixing layer after interaction and consequently most of the initial kinetic energy of the primary gas charge is dissipated in the mixing process. Thus, very little momentum can be transferred by means of compression waves and the fluctuations are small and, in particular, no reversals of the flow occur. As we reduce the frequency more, the maximum amplitudes of the flow fluctuations increase and at some particular value $f/f_n$ the flow is temporarily stopped during each cycle. A further decrease of $f/f_n$ results in still larger amplitudes about the mean values of velocity and pressure and the flow is temporarily reversed during each cycle. Finally, as $f/f_n$ has been decreased to 1, one has achieved resonance conditions and the peak oscillation amplitudes reach their maximum value. Of course, the peak amplitudes of the flow oscillations decrease again if the frequency ratio $f/f_n$ is decreased still more, but for no $f/f_n < 1$ will (temporary) flow reversals be absent. In fact, if the pressure in the plenum chamber downstream of the wave tube could somehow be kept higher than the pressure in front of the tube, that fraction of a period during which reverse flow occurs would become larger as $f/f_n$ would be decreased below 1, and finally a steady-state reverse flow would establish itself during each cycle as $f/f_n$ would be selected very close to zero.

Of particular interest to us are the two special cases $f/f_n = \infty$ and $f/f_n = 1$. The former case would result in a very low efficiency because it has the characteristics of a steady-flow ejector. Moreover, because of the low fluid density, the time-averaged mass flow rate per unit cross sectional area would be rather modest even though the flow velocity in the wave tube would remain constant.[24] If $f/f_n = 1$, then the energy dissipation due to mixing would be relatively small and, despite the shock losses and increased wall friction and exit losses (of kinetic energy), the energy transfer efficiency would be higher than in the steady flow case. On the other hand, the mass-averaged flow velocity at a fixed cross section would be extremely low because of the temporary reverse flow, and the reduction of the energy dissipation would not cause an increase of the fluid density large enough to result in an acceptable time-averaged mass flow rate per unit cross sectional area. A significant increase of the mass-averaged flow velocity would be obtained if reverse flow were avoided, and, at the same time, a very substantial reduction of the wall friction and exit losses would be obtained. Thus, it is believed that the total energy dissipation during an energy exchange cycle is minimized and the time-averaged mass flow rate is maximized if one operates the wave exchanger between the two special cases just mentioned. On the basis of preliminary estimates it is expected that the frequency for maximum mass flow rate is slightly higher than the frequency for minimum energy dissipation but that a frequency ratio $f/f_n$ between 2 and 3 represents an optimum compromise from the point of view of efficiency and flow capacity.[25]

The proper selection of the frequency ratio is a necessary but not sufficient measure for optimizing the wave exchanger's performance. While the frequency ratio determines the maximum amplitudes of the flow fluctuations for a given design, the variation of the magnitude of the maximum amplitudes over the length of a wave tube is determined by the tube geometry. In what follows we will differentiate between the designs with or without an afterburner downstream of the wave exchanger.

In most applications it is advantageous to arrange an afterburner (secondary combustor) and an exhaust nozzle in series with the wave exchanger as illustrated schematically in FIG. 4. The chamber downstream of the wave exchanger has actually three functions: (1) It acts as a plenum chamber, insuring that the flow through the exhaust nozzle is nearly steady, (2) it functions as a dilution chamber, i.e., it permits the mixing of primary and secondary fluid which, as noted earlier, are mixed only partially in the crypto-steady and wave energy exchanger, and (3) it acts as an afterburner.

It is obvious that the flow immediately upstream of a wave tube is radically different from the flow immediately downstream of the tube. At a fixed point in front of the wave tube the flow velocity changes sharply as primary and secondary fluid streams arrive alternately at this point. Moreover, even the smallest velocity at this point, the velocity of the secondary fluid, is relatively large (it is typically between 50% and 70% of the local speed of sound). In contrast to this situation the flow at some short distance downstream of a wave tube has a low average velocity and its fluctuations are rather small. These conditions are due to the fact that the flow area increases substantially at the exit of a wave tube.

In order to keep the mixing losses in the front portion of a wave tube small, one must achieve large flow fluctuations in this region. On the other hand, the velocity of the flow and its fluctuations should be kept as small as possible in the rear portion of a wave tube because most of the kinetic energy of the flow at the exit section of the tube is dissipated in the "dead water" regions immediately downstream and to the side of the tube exit (the flow area increases abruptly at the exit of the wave tubes). Thus we come to the conclusion that it is advantageous if the flow conditions immediately upstream and downstream of a wave tube can be extended some distance into the tubes.

Since the flow conditions immediately upstream of a wave tube are responsible for the primary waves of an energy exchange cycle, it is obvious that they exert a very strong influence upon the flow in the front portion of a wave tube. Moreover, if the tube would have a con-

---

[21] In this discussion we are not concerned with the question as to what is the largest permissible circumferential speed of the rocket rotor.

[22] Actually, no flow is strictly steady, because local fluctuations always take place. As pointed out by Foa (Elements of Flight Propulsion. J. Wiley & Sons, New York, 1960), the decision as to whether a flow may or may not be regarded as steady depends, in each case, on the maximum fluctuation amplitude that is considered negligible and on the scale of observation that is of interest in the problem at hand. In a practical sense, then, it is expected that a case of $f/f_n \gg 1$ is not different from the case $f/f_n = \infty$.

[23] This is a consequence of the fact that the state of the (homogeneous) mixture of gas and air downstream of the mixing region of a steady-flow ejector can be computed quite well without knowledge of the details of the mixing process, merely by satisfying the basic flow equations (conservation of mass, momentum and energy) at the beginning and end of the mixing region. Thus, it does not seem to matter significantly if mixing occurs in zones that widen gradually in downstream direction, as in ordinary steady-flow ejectors, or if—as mentioned earlier—very thin "slices" of primary and secondary fluid interact instantly with each other in toto and form thin mixing layers that span across the duct already near the entrance.

[24] The flow capacity would be particularly low if an afterburner would be arranged in series with the ejector whereby thermal choking would occur in the exhaust nozzle.

[25] F. Berner, op. cit.

stant cross section, this influence would remain strong throughout the tube. The flow conditions in the afterburner affect the flow in a wave tube considerably less because they are responsible only for the secondary waves [26] of an energy exchange cycle. It is necessary, therefore, that the influence of the flow conditions near the tube entrance upon the flow further downstream be weakened and that the influence of the flow downstream of the wave tube upon the flow within the tube be strengthened. This means that the strength of downstream propagating waves be weakened and that the strength of upstream propagating waves be strengthened. These effects are obtained if the cross section of the wave tube is increased toward its exit section. Such a design has the additional advantage in that the average flow velocity is decreased as well toward the exit section. On the other hand, it is also important that flow separation from the walls and certain other dissipative processes near the tube entrance be avoided to the largest possible extent because the kinetic energy of the flow is quite large in this region. Thus, the inflow into the tube should be facilitated by increasing the tube cross section toward the entrance section. These requirements can be met with a tube geometry that has the appearance of a venturi-like section, followed by a diffusor-like portion.

An additional effect, which is particularly desirable when the pressure is high downstream of the wave exchanger, shall be discussed here. Even though there will be a back-and-forth transfer of mechanical energy in the wave tubes because the energy transmitting waves are partially reflected at the extremities of the tubes as well as at positions inside the tube where large density gradients exist (mixing layers between neighboring fluid charges), the level of the time- or mass-averaged mechanical energy will not be uniform from tube entrance to tube exit. All wave tubes will act as more or less effective rectifiers for the energy flux in a way that the flux is larger in downstream direction than in upstream direction. This characteristic is due to the fact that the (downstream oriented) flow velocity is added to the sonic or supersonic propagation speed of downstream-travelling waves and that it is subtracted from the sonic propagation speed of upstream-travelling waves. Additional rectification can be achieved through proper wave tube design. In the ideal case of an inviscid, one-dimensional non-steady flow one can show with wave diagrams that the rectification of the energy flux with the downstream direction as the preferred direction can be appreciable if the wave tube is built like a venturi tube whereby the area change per unit length of tube is smaller downstream of the "throat" than upstream of the throat.

Because of the rectification effect the time-averaged mechanical energy increases toward the exit section of a wave tube. Since the flow capacity increases with an increasing mechanical energy of the flow, an uneven energy distribution with a below average energy level at the smallest cross section of the tube in its front portion causes a reduction of the wave tube's flow capacity. However, rectification has also an advantage in that it helps to prevent reverse flow through the exit section of a wave tube (whether reverse flow will or will not occur depends on the respective levels of mechanical energy immediately upstream and downstream of the exit section).

The above discussion pertained to designs which include an afterburner downstream of the wave exchanger. If no further component follows the wave exchanger, i.e., if the wave tubes have to perform also as exhaust nozzles, their geometry should still be the same as in the configuration discussed above. Computations show that in all situations of interest the (average) static pressure in the front portions of the wave tubes is above the ambient pressure. Consequently one aims to shape the wave tubes so that the flow is expanded toward their exit sections. Even though the flow Mach number in the front portion of a tube is intermittently supersonic and subsonic, a reasonably satisfactory expansion is believed to occur if the cross-section of the tube is increased in flow direction. When the flow is (temporarily) supersonic in its front portion, then a diffusor-like tube will act like the divergent portion of a DeLaval nozzle and the flow will expand and accelerate toward the exit section. When the flow is subsonic in the front portion of the tube, then an increase of the cross section will have the opposite effect. However, the acceleration of the flow is then caused by rarefaction waves which originate at the exit section of the tube and which can easily propagate upstream through the decelerated fluids. Such expansion and acceleration of the fluids by rarefaction waves in a diffusor-like tube is quite effective. Indeed, it is interesting to note that, unlike in the case of a tube with a constant cross section, the flow can become supersonic at the widened exit section of a tube after an upstream-propagating rarefaction wave has entered it (reason: the position where sonic speed is reached moves upstream; downstream of this position the flow will be supersonic if the ambient pressure is sufficiently low).

The combined effect of a divergent tube section in the case of supersonic velocities and upstream-propagating rarefaction waves in the case of subsonic velocities is expected to be not only a reduced (static) pressure, but also a substantial reduction of the pressure fluctuations at the exit. Moreover, since the transformations of the flow are governed essentially by the "characteristic equations" rather than by the energy equation (for a steady flow), the total mechanical energy of a fluid element is expected to fluctuate less and less as it is subjected to an increasing number of transformations during its travel through a wave tube. A damping of the pressure fluctuations at the exit thus is expected to be accompanied by a damping of the velocity fluctuations whereby the propulsive effieciency is increased.

(c) Combination of crypto-steady exchanger and wave exchanger

While, in principle, the wave exchanger could be used without a preceding crypto-steady exchanger, e.g., in conjunction with intermittently firing rockets using hypergolic propellants, we are interested here in rocket-type gas generators that operate continuously. Consequently, the wave exchanger will, in our application, be preceded by a crypto-steady exchanger. It is recognized that a design incorporating stationary "pulse rockets" which intermittently release charges of exhaust gas into (an equal number of) stationary wave tubes is strikingly simple, at least if uncomplicated propellant valves (possibly of the rotary type rather than the awkward solenoid-type) can be used. On the other hand, the proper tailoring of a crypto-steady exchanger to a wave exchanger can result in a very substantial improvement of the latter's performance, particularly its flow capacity. Moreover, since the flow of rocket gas into an individual wave tube should occur only during $\frac{1}{10}$ to $\frac{1}{5}$ of an energy exchange cycle, the number of rocket motors can be reduced by a factor of 5 to 10 if stationary pulse rockets are replaced by steadily operating, rotating rockets and if the number of wave tubes is left unchanged. In most situations this reduction of the number of rocket motors can be translated into a larger thrust-to-weight ratio of the propulsion system.

It was noted in the description of the crypto-steady exchanger that the vectors $\vec{c}_{p2}$ and $\vec{c}_{s2}$ of the relative

---

[20] We call primary waves the waves which are generated during the interaction between primary and secondary flow at the beginning of an energy exchange cycle. The secondary waves are generated at the (open) ends of the wave tubes when the primary waves reach these positions, i.e., they are the "reflected primary waves."

velocities of primary and secondary flows at the exit are parallel to each other and that the magnitudes $|\vec{v}_{p2}|$ and $|\vec{v}_{s2}|$ of the absolute velocity vectors of the two flows are quite different. Therefore, since relative and absolute velocities must form (closed) velocity triangles together with the vector $\vec{u}$ of the peripheral velocity, it follows that the vectors $\vec{v}_{p2}$ and $\vec{v}_{s2}$ of the absolute velocities do not have the same direction. The question arises how one has to design the "walls" which separate adjacent wave tubes. One can argue that, everything else being held constant, these walls should be very nearly lined up with the vectors of the absolute velocity of the secondary fluid at the exit of the crypto-steady exchanger. Of course, such a preferential accommodation of the secondary fluid will cause the entrance losses of the secondary fluid to be smaller than the entrance losses of the primary fluid. However, it is not likely to result in significantly higher entrance losses of the primary fluid than a design in which the wave tube walls are lined up with the vectors of the absolute primary flow velocity; it may actually reduce the entrance losses of the primary fluid. Indeed, since the primary fluid has a subsonic velocity in the wave tubes, while its velocity is supersonic throughout the crypto-steady exchanger, it must be decelerated in a shock system near the entrance sections of the wave tubes. With the proposed geometry the shocks in the primary flow will be oblique while at least some of the primary fluid might be decelerated by normal shocks if the front sections of the wave tube walls were parallel to the velocity vectors $\vec{v}_{p2}$. Of course, one will try to reduce flow separation due to misalignment by shaping the front sections of the walls like blades of turbomachines rather than like sheets and by introducing a small "angle of attack" relative to the secondary flow. Because the wave tubes are quite long compared with the chord of blades of axial turbomachines, the rear sections of the walls can be shaped like plates. And because the flow should have no angular momentum at the exit of the wave exchanger, these plates should coincide with planes that contain the axis of symmetry of the energy exchanger.

It should be noted that the flow directions will change with the flight condition because the latter affects the properties of the secondary fluid. If the geometry is completely fixed, it is not possible to achieve a perfectly optimized line-up of the wave tube walls with the vectors of the absolute secondary flow velocity, except, perhaps, at a particular "design point." This situation is similar to the situation in aviation gas turbines. Like in the latter, which sometimes are equipped with movable stator blades, one may have to carefully compare the potential performance advantages arising from movable vanes or walls with the weight, reliability and cost penalty of a departure from a fixed geometry design. Two possibilities exist for adjusting the angle between the secondary flow at the exit of the crypto-steady exchanger and the side walls of the wave tubes near their leading edges: One can change the flow angle (or keep it constant with changing flight condition), or one can change the direction of the wave tube walls. The latter scheme would require the installation of movable (e.g., hinged) front sections of the wave tube walls, the rear portions of these walls being fixed. Somewhat simpler would be a scheme to change the flow direction. It could be achieved by changing the direction of the guide vanes of the secondary fluid upstream of the crypto-steady exchanger because a modification of the velocity triangle near the merger station will cause a change of the velocity triangle at the exit of the crypto-steady exchanger.

Still another method of redirecting the flow involves the change of the rocket rotor's r.p.m. However, a variation of the r.p.m. also brings about a change of the frequency $f$ of the energy exchange cycles and should primarily be made for just this purpose. In general, both the frequency ratio $f/f_n$ for optimum performance and the natural frequency $f_n$ depend on the flight condition. The natural frequency increases with the speed of sound of the fluids in a wave tube and hence will be affected by the ambient temperature and flight speed, and the frequency ratio is likely to depend on other engine parameters, such as the entrainment ratio or compression ratio,[27] which in turn, are affected by the flight condition.

Perhaps the most important disadvantage of nonsteady flow devices is their very low flow capacity. In the preceding section some reasons were given in support of our contention that the wave exchanger will admit a much higher time-averaged mass flow rate than other nonsteady flow devices having the same frontal area. Nevertheless, some further discussion of this aspect is desirable. Specifically, one wants to know which of the two devices, the wave exchanger or the crypto-steady exchanger, will limit the secondary fluid mass flow through the thrust augmenter or hybridized propulsion system.[28]

To obtain a feeling for the respective flow capacities of crypto-steady and wave exchanger, it is useful to draw parallels to the flow through a turbo-compressor stage. Because the crypto-steady exchanger operates in a fashion quite similar to an ordinary turbo-compressor (rotor), one expects its maximum permissible mass flow rate to be quite high. The wave exchanger, on the other hand, might, at first, be suspected of admitting a smaller (time-averaged) mass flow rate because it has certain similarities with (other nonsteady flow) devices that are known to have mediocre flow capacities. This is not to say that the unsteadyness of the flow per se could be responsible for a lower flow capacity. Indeed, even though the flow in the stator of an ordinary turbo-machine is clearly nonsteady,[29] the stator does admit very nearly the same maximum mass flow as the rotor in front of it. Possible differences between the flow capacities of stators and wave exchangers are primarily due to two differences in their respective modes of operation. In an ordinary stator the fluid flows nonsteadily but nevertheless continuously through fixed passages between blades. In the wave exchanger the corresponding fluid (the secondary fluid) flows only intermittently through a fixed flow area because an additional fluid (the primary fluid) must intermittently pass through the same flow area as well. This first difference by itself would obviously cause the wave exchanger to admit a time-averaged secondary fluid mass flow rate which would be below the maximum possible mass flow rate in ordinary stators of equal frontal area. An opposing effect results from the second difference between stators and wave exchangers: In the former the fluid does not receive any energy and it flows with a (time-averaged) velocity that is about equal to the relative velocity in the preceding rotor.[30] In a wave tube, the secondary fluid does receive

---

[27] The compression ratio is defined here as the ratio of stagnation pressure in the plenum chamber to the stagnation pressure of the secondary fluid upstream of the energy exchangers.

[28] Actually, it is probable that neither of the two energy exchangers will restrict the air flow through the engine under normal operating conditions. Assuming maximum afterburning, the exhaust nozzle, even if fully open, is likely to restrict the mass flow at low flight speeds. At somewhat higher flight speeds the restriction occurs probably in the smallest (flow) cross section of the air intake. Finally, at high flight speeds the air mass flow rate is determined by the air capture area, free stream density and flight speed.

[29] R. C. Dean, Jr.: "On the Necessity of Unsteady Flow in Fluid Machines," Trans. of the ASME, Journ. of Basic Eng., March 1959.

[30] In a turbine the (absolute) velocity in the stator is somewhat larger than the relative velocity in the preceding rotor. In the stator of a turbo-compressor stage the velocity is, in general, about equal to or slightly smaller than the velocity in the preceding rotor.

additional energy (from the primary fluid) and consequently it will become denser and it will be accelerated to a velocity which is larger than its absolute velocity in the preceding crypto-steady exchanger.

It is obvious that the first of the two effects depends primarily on the difference in density of primary and secondary fluid and on the entrainment ratio (= time-averaged secondary fluid mass flow rate divided by time-averaged primary fluid mass flow rate). The respective densities of the two fluids are determined by the rocket propellant combination and by the flight condition; there is very little freedom for their selection. The entrainment ratio could be selected arbitrarily by judiciously sizing the rocket motors relative to the overall engine. However, an optimum combination of specific impulse and thrust-to-weight ratio of the propulsion system is generally achieved with a particular entrainment ratio. Thus, this ratio is rather well determined, provided of course, that the application is specified. It follows that one has a rather restricted control over the first effect.

The second effect, i.e., the effect of energy addition to the secondary fluid in the wave tubes, can be altered substantially only if the wave exchanger is preceded by a crypto-steady exchanger. It depends essentially on the difference in mechanical energy of primary and secondary flow immediately upstream of the entrance sections of the wave tubes. Since the static pressures of the two flows are the same at this position, the second effect depends substantially on the difference of kinetic energies of the flows or on the kinetic energy ratio $v^2_{p2}/v^2_{s2}$, this effect being increased if the kinetic energy ratio is increased. This ratio can be varied within a rather large range either by increasing or decreasing the second phase of crypto-steady energy exchange or by reversing the energy transfer during the second phase exchange. It was noted earlier that such changes can be obtained by judiciously selecting the contours of the crypto-steady interaction region, i.e., by selecting a certain exit cross section of the crypto-steady exchanger relative to the secondary flow entrance cross section of the crypto-steady exchanger and by suitably varying the cross section of the annular space between the entrance and exit. Thus, we come to the important conclusion that, through the arrangement of a properly tailored crypto-steady exchanger in front of a wave exchanger, the latter's flow handling capability can be substantially increased, whereby the thrust-to-weight ratio of an engine utilizing this component will be increased as well.

A further beneficial effect is obtained if a crypto-steady exchanger is added to and precedes the wave exchanger. In general, the dissipation of mechanical energy in the crypto-steady exchanger is considerably lower than in the wave exchanger. Thus, if a fraction of the initial difference in mechanical energy of primary flow and secondary flow is transferred from the former to the latter in the crypto-steady exchanger, the overall energy transfer efficiency is increased. This means that the mechanical energy of the fluid at the exit of the wave tubes will, on average, be increased if a crypto-steady exchanger precedes the wave exchanger. It follows then that the efficiency of the thermodynamic cycle of the engine is increased as well and that the fuel economy (e.g., specific impulse) will be improved.

In the drawings:

FIG. 1a is a transverse cross-sectional view taken on line 1a of FIG. 1, showing the rotary gas deflector;

FIG. 1b is a transverse cross-sectional view taken on line 1b of FIG. 1, showing the wave tube walls;

FIG. 1c is a cross-sectional view taken on line 1c of FIG. 1a, showing the exit sections of the flow passages of the rotary gas deflector and showing also the profiles of the struts;

FIG. 1d is a cross-sectional view taken on line 1d of FIG. 1b, showing the wave tube walls;

Figure 1:
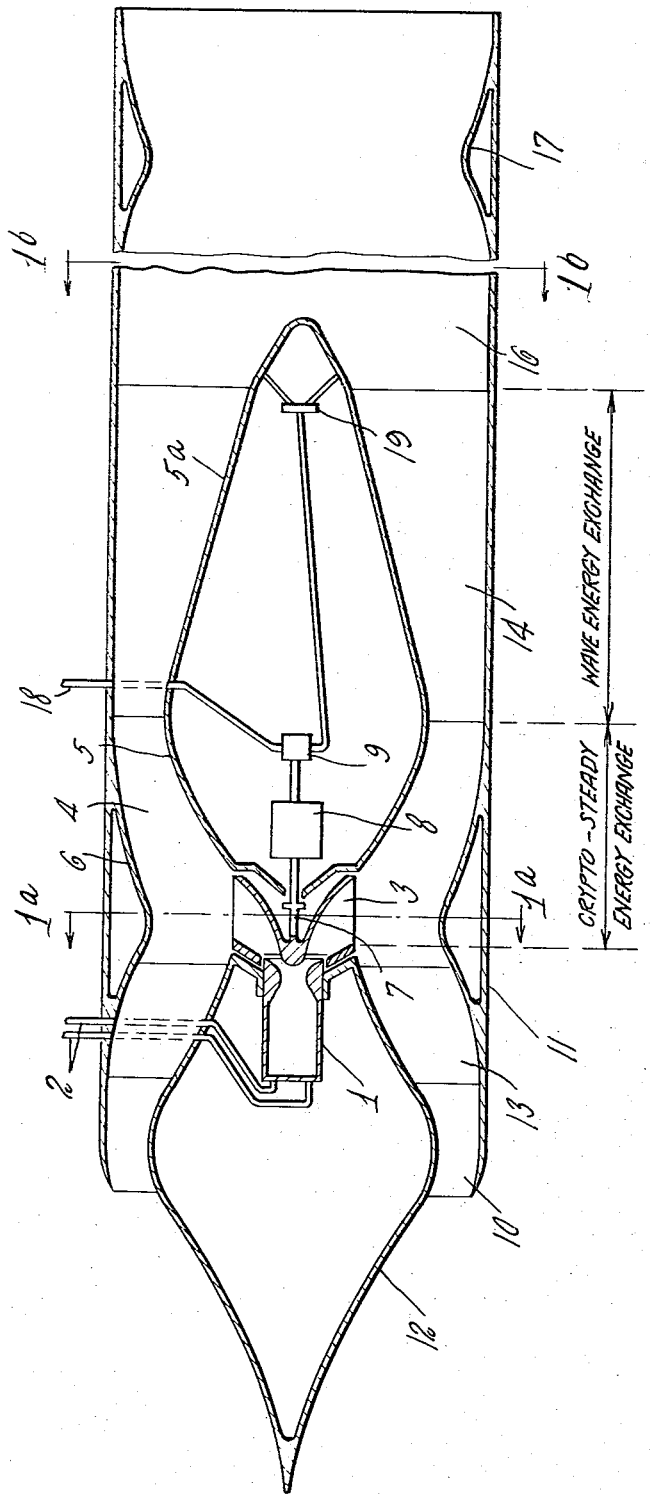
FIG. 1 is a cross-sectional view of a preferred embodiment of a thrust device according to the invention, taken along the direction of elongation of the device.
Figure 2A:
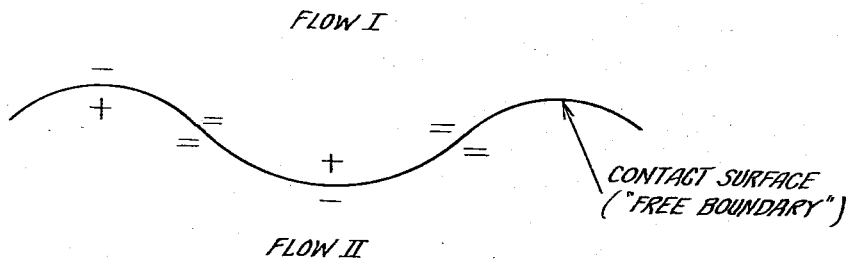
FIG. 2a shows, in diagrammatic form, the pressure along a curved contact surface of two flows having subsonic velocities relative to the contact surface.
Figure 2B:
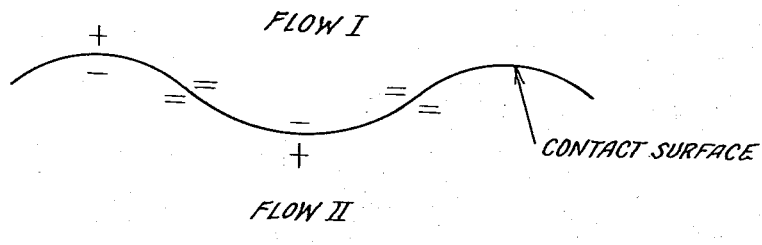

FIG. 2b, similar to FIG. 2a shows the pressure along a curved contact surface of two flows having supersonic velocities relative to the contact surface;

FIG. 3 is a cross-sectional view similar to FIG. 1 of another preferred embodiment of the invention;

FIG. 3a is a transverse cross-sectional view of the embodiment of FIG. 3 taken on line 3a thereof;

FIG. 3b is a diagram illustrating the charging of the wave tubes of the embodiment of FIG. 3, and also presenting velocity triangles and other diagrammatic data helpful to the understanding of the invention, and referred to above;

FIGS. 4 through 4d are views similar to FIGS. 1 through 1d, respectively, of another preferred embodiment of the invention.

With reference to FIG. 1, a preferred embodiment of the invention comprises a thrust device suitable for high speed flight vehicles operating in the atmosphere. In this device a gas generator 1 is fixedly mounted and provided with supply lines 2 to receive liquid oxidizer and liquid fuel, or a liquid monopropellant. The generator is adapted to release gas of high specific energy into a rotary deflector member 3. This deflector member divides the gas flow into a plurality of streams and releases these flows into a flow passage 4 defined by stationary walls 5 and 6 in the form of surfaces of revolution arranged coaxially. The flow channels of the deflector member 3 are shaped so that energy is extracted from the gas streams in a manner like a turbine, certain walls of the deflector serving the function of vanes.

The rotary deflector member 3 is rigidly connected to shaft 7 whose speed is controlled by control device 8. This shaft, through appropriate mechanical connections drives an auxiliary device 9 such as an electric energy generator or fuel pump.

The passage 4 is in flow communication with an air inlet 10 which is defined by rigid outer casing 11 and center body 12, the latter forming an inlet spike. The center body 12 is rigidly supported by struts 13 fixed to the outer casing 10, and the propellant lines 2 pass through the struts 13, connecting the gas generator 1 inside the center body with propellant tanks, not shown.

During operation of the engine air is aspirated or scooped from the surrounding atmosphere by inlet 10 and conducted to passage 4 where it interacts in a crypto-steady fashion with the plurality of gas streams which are released by deflector 3, as described in detail above.

Struts 13 can be shaped so that they confer a circumferential velocity component to the air flow at the position where it merges with the gas flow.

In the embodiment of FIG. 1 the walls 5 and 6 defining the passage 4 in which the crypto-steady inter-action occurs are arranged so that the circumferential speed of the spiral patterns formed by the inter-acting gas and air streams increases in the downstream direction. Because the angular velocity of these patterns remains constant, such an increase of circumferential velocity is obtained by shaping walls 5 and 6 so that their distance from the axis of symmetry increases in the downstream direction.

The crypto-steady inter-action space or passage 4 is followed by a circumferential series of tubular ducts 14 which admit the gas and air streams from the passage 4. These ducts are formed by connecting outer wall 6 or outer casing 10 with inner wall 5 with a circumferential series of walls 15. At least the front portions of walls 15 are shaped in a manner such that they form profiles having contours similar to the contours of air foils or blades of turbomachines, and having a small or no angle of attack relative to the air streams immediately upstream of their leading edges. The rear portions of walls 15 have substantially planar surfaces which are substantially parallel to the axis of symmetry of walls 5 and outer casing 11.

As the streams of gas and air sweep across the leading edges of walls 15 they are broken up into individual portions or charges which enter the wave tubes 14 and interact with each other in a manner described in detail above.

The distance between two adjacent walls 15 is selected so that gas and air charges enter substantially in sequence rather than in parallel into the individual wave tubes. The flow in the wave tubes 14 being unsteady, these tubes are characterized by a natural frequency which, among other parameters, depends upon the length. The length of walls 15 is selected so that, under normal operating conditions, the natural frequency of the wave tubes is smaller than the frequency with which the primary gas charges arrive at the entrance sections of wave tubes 14.

The wall 5 is shaped so that the wave tubes 14 have an increasing cross-section toward their exit sections. Downstream of these exit sections wall 5 ends in a rear facing surface which substantially seals the space inside wall 5 from the space downstream of the exit sections of wave tubes 14. Thus wall 5 actually defines a second center body which is supported by the outer casing 11 by walls 15 and which is not directly connected with center body 12.

Downstream of the exit sections of wave tubes 14 there is a substantially cylindrical chamber 16 into which the wave tubes discharge fluid. Chamber 16 functions as a plenum chamber in which the flow fluctuations emerging from the wave tubes are damped, and it functions also as a secondary combustion chamber. Fuel for secondary combustion can be introduced in several ways, e.g., by means of a secondary fuel line 18 and manifold 19 from which it is conducted to a plurality of fuel injectors, not shown. This arrangement, forming an after burner, is followed by an exhaust nozzle 17. Although not shown, exhaust nozzle 17 and air inlet 10 can be of the variable geometry type as on other propulsion systems designed for operation over a wide range of flight speeds and altitudes.

Referring to FIGS. 1a and 1b it can be seen that the trailing edges of the struts 13 are curved in the direction opposite that of the direction of rotation of the deflector member 13, and that the exit end of the channels 3a of the gas deflector member are of elongated shape in the direction of the axis of symmetry. Referring to FIG. 1, the gas stream that emerges with this shape from the side of the deflector 3 turns as it moves outwardly through the curved passage 4, causing substantially all of the passage to be swept by primary gas particles in the spiral pattern.

Referring to FIG. 1b it can be seen that the walls 15 merge into the after body 5a at the exit end of the wave tubes 14. Referring to FIG. 1d, the curved nature of the leading edges of the walls 15 can be seen.

Referring to FIG. 3, where like numbers are applied to like elements, an embodiment without an after burner is shown.

Another preferred embodiment of the invention is shown in FIG. 4. In this configuration a plurality of gas generators 20 are evenly spaced circumferentially around the longitudinal axis of the engine and are rigidly connected with a shaft 22 which is rotatably supported by bearings 23. The bearings are rigidly connected either with center body 12 or with after body formed by wall 5, or by both as shown. Center body 12 is supported by the outer casing 11 by struts 13 and after body formed by wall 5 is supported by the outer casing 11 by wave tube walls 15, similar to the preceding embodiments.

Stationary propellant lines introduce the oxidizer at one end of hollow shaft 22 and the fuel at the other end of the hollow shaft. A solid portion inside the otherwise hollow shaft prevents mixing of fuel and oxidizer inside the shaft. Propellant lines 24 establish a flow connection between the hollow space within the shaft and the oxidizer and fuel injectors (not shown) of gas generators 20. By virtue of their rotation around the longitudinal axis of the engine, propellant lines 24 function as propellant pumps.

The nozzles of generator 20 are slightly skewed so the gas jets leaving the nozzles cause a circumferential component of the thrust force to appear, to provide the power for driving the rocket mount, thereby the inherent pump, as well as other equipment. The speed of rotation of the shaft 22, which is very important for obtaining the proper inter-action of gas and air streams, is controlled by speed control system 25 which may comprise a braking device, which is mechanically connected with shaft 22 by gears 26 and 27.

In this arrangement, similar to FIG. 3, no after burner is shown. Here the wave tubes 14 function as exhaust nozzles, as described above in detail.

Numerous modifications in the specific details of the embodiments given can be made within the spirit of the invention.

What is claimed is:

1. Means for the exchange of momentum or mechanical energy between a first fluid medium and a second fluid medium having a lower initial mechanical energy per unit mass than the first fluid medium comprising the combination of first means adapted to enable said first fluid medium to act on the second fluid medium in a fashion similar to the action of rotor blades in turbo compressors and downstream thereof a second means adapted to enable said first fluid medium to act on the second fluid medium in a fashion resembling the compressive action of pistons in piston compressors or pushing elements in positive displacement pumps, said first means comprising a passage having an inlet for said second medium and a moving assembly adapted to direct a progressive pattern of said first medium against said second medium, and said second means comprising a passage having charge-defining walls providing an entry to the passage located in a region through which said pattern of said first medium repeatedly passes while substantially coherent and distinct from said second medium, said charge-defining walls shaped and positioned to intercept in an alternate manner a distinct charge predominantly of said second medium, and upon passage of said progressive pattern through said region a distinct charge of predominantly said first medium, said passage and said first means cooperatively related to permit said charges to proceed successively down said passage whereby an effective exchange of momentum or mechanical energy can take place.

2. Energy exchange means according to claim 1 wherein said second fluid medium flows from a substantially annular first space to a substantially annular second space, and wherein said first fluid medium is discharged from flow conduits to said second space in form of a plurality of circumferentially evenly distributed jets with fluid particle velocity components directed away from said first space, said flow conduits being part of rotating means revolving about the axis of symmetry of said second space whereby, upon leaving said flow conduits, the jets of said first fluid medium are continuously displaced circumferentially within said second space, thereby causing said first action of said first fluid medium on said second fluid medium in said second space before both fluid media are released from said second space into a substantially annular third space, said first, second and third spaces being arranged in the enumerated order in axial direction and being formed by two substantially rotationally symmetric and co-axially arranged surfaces, and the third space being divided into a plurality of flow passages with generally axial direction by a plurality of circumferentially evenly distributed and substantially radially disposed wall members, each of which rigidly connects a stationary inner wall member having an outer surface defining the inside of said third space with a stationary outer wall member having an inner surface defining said third space on the outside, each of said flow passages having a cross section of such a magnitude relative to the cross section of said jets formed by said first fluid medium in said second space that the flow passages admit alternately charges consisting predominantly of first fluid medium and charges consisting predominantly of second fluid medium by virtue of the fact that the jets formed by said first fluid medium in said second space are continuously displaced circumferentially relative to said stationary flow passages, whereby said second action of said first medium on said second medium takes place in said flow passages due to the intermittent entering of charges of different fluid composition into said flow passages.

3. Energy exchange means as described in claim 2 wherein said substantially radially disposed wall members dividing said third space into said flow passages near and at their leading edges facing said second space are shaped so as to reduce or eliminate losses due to flow separation at or near said leading edges whereby a section through a wall member in circumferential direction shows a profile near said leading edge similar to an airfoil profile or a profile of blades of ordinary turbomachines, said profile having a centerline with a direction at the leading edge intermediate to the flow directions of said first fluid medium and said second fluid medium in the rear portion of said second space immediately preceding said third space, said centerline being gradually curved in rearward direction into a plane containing the axis of symmetry of said third space.

4. Energy exchange means as described in claim 3 wherein the substantially rotationally symmetric surfaces defining said third space are shaped so that the flow cross section of each of said flow passages first decreases gradually from the entrance in rearward direction and then increases gradually toward the exit of said flow passage whereby the minimum cross section occurs in the front half of said flow passage and the exit cross section is at least equal in magnitude to the entrance cross section.

5. Energy exchange means as described in claim 4 wherein means are provided to control the revolutions of said rotating means comprising said fluid conduits for said first medium, whereby the product of number of jets of said first fluid medium in said second space and the number of revolutions per second of said rotating means is larger than the speed of sound of the fluid media in the flow passages of said third space, divided by four times the length of the flow passages of said third space, this length being given in the same units in which the speed of sound is indicated per second.

6. Energy exchange means according to claim 2 wherein said rotating means comprising said fluid conduits for said first fluid medium is a rotary member having an axis of revolution coinciding with the axis of symmetry of said second space and being positioned inside the front portion of said annular second space, and wherein said first fluid medium is a gas formed through burning of a fuel with an oxidizing agent in a stationary combustion chamber at a stagnation pressure substantially higher than the stagnation pressure of said second fluid medium, said combustion chamber being followed by a stationary nozzle with rotationally symmetric flow cross sections having an axis of symmetry coinciding with the axis of symmetry of said second space, said nozzle admitting said first fluid medium from said combustion chamber, converting some of the potential energy of said first fluid into kinetic energy, and then releasing it in form of a single flow to said rotary member, said rotary member dividing said single flow of said first fluid medium into a plurality of flows, expanding said first fluid medium in said fluid conduits, and then releasing it in form of a plurality of jets into said second space in a partially radially outward and partially axial direction toward said third space.

7. Energy exchange means as described in claim 6 wherein said rotary member has an outer surface forming the front portion of the inner surface of said second space with the exception of the openings representing the exit sections of said fluid conduits for said first fluid medium, said outer surface of said rotary member being shaped so as to be flush with the outer surfaces of stationary wall members limiting on the inside said first space upstream of said rotary member and the remaining portion of said second space and third space downstream of said rotary member, said first, second and third spaces being limited on the outside by the inside surface of a stationary wall member which is rigidly connected with the wall member defining the inside of said first space by means of struts reaching radially across said first space, said struts completing a rigid structural connection between the stationary wall member defining the inner boundary of said first space and the stationary wall member defining the inside of the rear portion of said second space and of said third space.

8. Energy exchange means as described in claim 7 wherein said struts reaching radially across said first space are shaped like guide vanes and are disposed so as to cause said second fluid medium to have angular momentum at the entrance to said second space, said angular momentum having a direction opposite to the direction of rotation of said rotary member.

9. Energy exchange means as described in claim 6 wherein said fluid conduits of said rotary member are slightly turned out of meridian planes in direction opposite to the rotation of said rotary member so as to cause the jets of said first fluid medium to exert reaction forces with peripheral components whereby said rotary member functions as a supplier of shaft energy which can be used for fuel pumping and for other energy consuming functions.

10. Energy exchange means as described in claim 2 wherein said rotating means comprises a plurality of gas generators with decomposition chambers circumferentially evenly distributed around a rotatably supported tubular shaft with the axis of rotation coinciding with the axis of symmetry of said first and second spaces, said gas generators being rigidly connected with said tubular shaft and admitting a single liquid compound capable of an exothermic decomposition resulting in a first fluid medium consisting of a substantially gaseous fluid at a pressure which is substantially higher than the stagnation pressure of said second fluid medium at the entrance to said second space, said liquid compound being fed by a stationary conduit to said tubular shaft which is in fluid communication with each of said gas generators by means of feed lines, thereby permitting the liquid compound to flow from said stationary conduits to said moving gas generators, each of said gas generators also comprising a nozzle capable of expanding said first fluid medium and acting as fluid conduit by discharging it in form of a jet to said second space in a partially radially outward, partially axial direction toward said third space, said feed lines connecting said tubular shaft with said gas generators acting as pumps for said liquid compound due to the centrifugal forces acting on the liquid in the feed lines as a result of their rotation about said axis of symmetry, the power required for rotating said tubular shaft and other means connected with it being extracted from said first fluid medium by directing said nozzles acting as fluid conduits in such a way that each of said jets exerts a reaction force with a peripheral component in the direction of rotation of said rotating means.

11. Propulsion means suitable for propelling objects in the atmosphere, comprising energy exchange means as described in claim 2 and also comprising air intake means, secondary combustion means, and an exhaust nozzle, said air intake means being in flow communication with said first space and comprising an outer shroud which is upstream of and rigidly connected with the wall member defining the outer boundary of said first space, said air intake means also comprising a center body in front of and rigidly connected with the wall member defining the inner boundary of said first space, said secondary combustion means comprising a plenum chamber which is located downstream of said third space and which admits the fluid media leaving said flow passages of said third space, said plenum chamber being formed by a wall member which is rigidly connected with the wall member defining the outer boundary of said third space on one side and with the exhaust nozzle on the opposite side, the wall members defining the boundaries of said third space being designed so that said second space is in flow communication with said plenum chamber solely through the flow passages of said third space, said plenum chamber having a cross section and volume to result in a significant dampening of the flow pulsations resulting from the nonsteady flow conditions in the flow passages of said third space and to permit substantial mixing of said first fluid medium with said second fluid medium and moreover to permit combustion in said plenum chamber without requiring flame-holders.

12. Propulsion means as described in claim 11 comprising movable guide vanes arranged in said first space to permit a change of the direction of the air flow from said first space into said second space with changing flight conditions in such a way that the resultant change of the direction of the flows immediately upstream of said third space brings about optimum conditions for each flight condition.

13. Propulsion means according to claim 11 wherein the means for controlling the angular velocity of said rotating means comprises a sensor measuring the temperature of the ingested air, and means permitting to change the angular velocity of the rotating means with changing fluid temperature in such a way that, over a significant range of flight conditions, the product of number of jets of said first fluid medium in said second space and the number of revolutions per second of said rotating means is about equal to the speed of sound of the fluid media in the flow passages of said third space, divided by twice the length of the flow passages of said third space, this length being measured in the same units in which the speed of sound is measured per second.

14. Jet propulsion means suitable for propelling objects in the atmosphere, comprising energy exchange means as described in claim 9 wherein the flow passages of said third space are designed to function as exhaust nozzles, this propulsion means also comprising air intake means being in flow communication with said first space and comprising an outer shroud which is upstream of and rigidly connected with the wall member defininfi the outer boundary of said first space, said air intake means also comprising a center body in front of and rigidly connected with the wall member defining the inner boundary of said first space.

References Cited
UNITED STATES PATENTS

| | | | |
|---|---|---|---|
| 895,654 | 8/1908 | Meyersburg | 230—108 |
| 922,595 | 5/1909 | Keller | 230—108 |
| 1,009,908 | 11/1911 | Lafore | 230—108 |
| 3,046,732 | 7/1962 | Foa | 60—39.02 |

MARK M. NEWMAN, *Primary Examiner.*

D. HART, *Assistant Examiner.*

UNITED STATES PATENT OFFICE
CERTIFICATE OF CORRECTION

Patent No. 3,357,191                          December 12, 1967

Felix Berner

It is hereby certified that error appears in the above numbered patent requiring correction and that the said Letters Patent should read as corrected below.

Column 3, line 60, for "re-requirement" read -- requirement --; column 5, line 42, strike out "It is shown in Appendix A of this report" and insert instead -- one can show --; line 70, strike out "we will first discuss and later evaluate" and insert instead -- we will here discuss --; column 10, lines 38 and 39, strike out ", but we will perform the analysis for the last-mentioned design"; column 11, line 56, for "loses" read -- losses --; column 12, line 16, for "our" read -- out --; lines 39 and 40, strike out "is made in a subsequent section.  It is found" and insert instead -- shows --; column 14, line 22, strike out "25"; line 75, strike out "$25_F$. Berner, op. cit."; column 26, line 21, for "defininfi" read -- defining --.

Signed and sealed this 15th day of April 1969.

(SEAL)
Attest:

EDWARD M.FLETCHER,JR.                    EDWARD J. BRENNER
Attesting Officer                          Commissioner of Patents